(12) United States Patent
Ainslie

(10) Patent No.: US 6,351,679 B1
(45) Date of Patent: Feb. 26, 2002

(54) VOICE ANNOUNCEMENT MANAGEMENT SYSTEM

(75) Inventor: Gordon Douglas Ainslie, Ringwood East (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/214,500

(22) PCT Filed: Aug. 19, 1997

(86) PCT No.: PCT/AU97/00527

§ 371 Date: Dec. 30, 1998

§ 102(e) Date: Dec. 30, 1998

(87) PCT Pub. No.: WO98/08334

PCT Pub. Date: Feb. 26, 1998

(30) Foreign Application Priority Data

Aug. 20, 1996 (AU) ............................................. PO1781

(51) Int. Cl.[7] ............................................. G06F 17/00
(52) U.S. Cl. ........................... 700/94; 700/88; 704/275; 379/88.25
(58) Field of Search ........................... 700/94; 704/275; 379/67.1, 88.04, 88.16, 88.22, 88.25

(56) References Cited

U.S. PATENT DOCUMENTS

| | | | | |
|---|---|---|---|---|
| 4,663,777 A | * | 5/1987 | Szeto | 379/67.1 |
| 5,231,670 A | * | 7/1993 | Goldhor et al. | 704/275 |
| 5,355,302 A | | 10/1994 | Martin et al. | 700/234 |
| 5,740,231 A | * | 4/1998 | Cohn et al. | 379/88.22 |
| 5,870,454 A | * | 2/1999 | Dahlen | 379/88.14 |
| 5,959,945 A | * | 9/1999 | Kleiman | 369/30 |
| 5,991,374 A | * | 11/1999 | Hazenfield | 379/101.01 |

FOREIGN PATENT DOCUMENTS

| | | |
|---|---|---|
| EP | 678851 A1 | 10/1995 |
| WO | 92/17009 | 10/1992 |
| WO | 94/11858 | 5/1994 |

* cited by examiner

*Primary Examiner*—William Grant
*Assistant Examiner*—Sheela S. Rao
(74) *Attorney, Agent, or Firm*—Nixon & Vanderhye P.C.

(57) ABSTRACT

A central control and management station (10) is provided for automatically creating, loading, modifying and/or checking recorded audio announcements at a plurality of remotely located playback devices (20) of a plurality of vendors in a telecommunications network. The station (10) includes a library of voice files (13), an access database (18) containing machine identification details and access instructions for each of the remotely located playback devices (20), a management unit (11) for receiving requests from vendors to load or modify recorded announcements in the playback devices (20) and a control unit (12) which sends the recorded announcements via loading interfaces (17) to the playback devices (20). The station (10) includes or is connected to a text to speech converter (15) and/or a digital voice recording station (30) for creating new announcements so that if a requested announcement is not present in the voice files (13) the management unit (11) can automatically request the creation of a new announcement. The station (10) also includes a voice recognizer (19) for verifying that a recorded announcement has been correctly loaded in a playback device (20).

20 Claims, 4 Drawing Sheets

VOICE ANNOUNCEMENT MANAGEMENT SYSTEM

This invention relates to a telecommunications system for automatically creating, loading, modifying and/or checking recorded audio announcements at a plurality of remotely located playback devices from a central location.

In large telephone networks recorded voice announcements are used by playback devices to provide information messages on network events, such as wrong numbers and failures in the network, and for interactive services such as voice mail boxes and bill paying, and use of network services, such as call diversion.

Each playback device has a specific method of loading the required announcements. Many playback devices use direct voice recordal, some use recorded data files and others require a change to a hardware device such as an EPROM (Erasable Programmable Read Only Memory). A telephone network may include a large number of geographically dispersed playback devices belonging to a plurality of vendors providing different telephonic services. Therefore, a large number of different announcements may be required to be loaded into an even larger number of geographically dispersed playback devices. Currently, it is necessary for the announcements, which may be recorded by a voice artist or artificially generated, to be physically loaded individually into each playback device, and with a large number of different announcements required for an even larger number of geographically dispersed playback devices for multi-vendors, it can be a very laborious process to load the announcements for all the playback devices, and a long and difficult process to make changes or additions to some or all of the recorded announcements.

It is therefore desirable to provide an improved system for loading and/or modifying a plurality of audio announcements in a plurality of playback devices at geographically dispersed locations.

It is also desirable to provide a system for rapidly creating new recorded announcements and loading the new announcements into remotely located playback devices.

According to one aspect of the invention there is provided a telecommunications system including a plurality of remotely located playback devices belonging to a plurality of different vendors providing different telephonic services in a telephone network, wherein said system includes a central control and management station adapted to automatically load and/or modify recorded announcements in the plurality of remotely located playback devices of the different vendors, said station including:

announcement storage means for storing a plurality of recorded announcements;

access storage means including access details for each of the remotely located playback devices of said plurality of different vendors;

a management means adapted to receive requests from a vendor to load or modify a recorded announcement in at least one of said remotely located playback devices of said vendor; and control means adapted to send the requested recorded announcement to said at least one remotely located playback device of said vendor via the telephone network for loading in said at least one remotely located playback device.

Preferably, the access storage means includes machine identification details and access instructions for each of the plurality of remotely located playback devices, and the recorded announcements are sent to the remotely located playback devices by the control means using the machine identification details and the access instructions.

The central control and management station preferably includes a plurality of loading interfaces for communicating with the plurality of remotely located playback devices via different communication means or protocols.

Preferably, the access storage means includes a vendor database containing vendor identification details relating to the different vendors offering recorded announcement services in the telephone network, and access details relating to the communication means or protocols used to access each vendors playback machines.

The recorded announcements to be loaded into the remotely located playback devices are preferably voice announcements for use in a wide variety of applications such as voice mail, interactive voice response, e.g. for paying of bills by telephone, and recorded information services, particularly those which are required to be updated at frequent intervals, e.g. weather reports and stock market information services. It will, however, be appreciated that the term "recorded announcements" in the present invention may encompass other types of recorded audio "announcements" such as hold music and series of tones recognizable by deaf or partially deaf people.

The recorded announcements are preferably stored in digital form and may be produced by a number of different methods, such as by digital voice recording or by text to speech conversion processes.

The recorded announcements at the central control and management station may be added to or modified at any time, so that recorded announcements loaded into the remotely located playback devices may be modified at any time under the control of the central control and management system. It is therefore a relatively easy task to load and/or modify recorded announcements at one or more of the remotely located playback devices via the telephone network from the central control and management system as compared with the laborious task of physically loading audio announcements into a large number of playback devices at geographically dispersed locations.

The present invention is particularly advantageous when it is required to load or modify the same recorded announcement at a plurality of playback devices at different remote locations. Further, recorded announcements for different vendors providing different services in the telephone network can be loaded and/or modified in their remotely located playback devices from a common central control and management station.

According to another aspect of the invention there is provided a telecommunications system for automatically creating and loading or modifying recorded announcements in a plurality of remotely located playback devices in a telephone network, said system including a central control and management station including:

announcement storage means for storing a plurality of recorded announcements;

access storage means including access details for each of said remotely located playback devices;

management means adapted to receive requests to load or modify a recorded announcement in at least one of said remotely located playback devices; and control means adapted to send the requested recorded announcement to said at least one remotely located playback device;

wherein the system includes announcement generating means for creating new announcements for storage in said announcement storage means; and the management means is programmed to check whether the requested announcement is present in the announcement storage means and, if the requested announcement is not present, the system is arranged to create a new announcement automatically for storage in the announcement storage means.

The recorded announcement generating means may include a digital voice recording means for recording voice announcements in digital form. Alternatively or additionally, the recorded announcement generating means may include a text to speech converter which is able to convert text, produced from a computer or keyboard into voice announcements in digital form which can subsequently be played back by the remotely located playback devices.

The announcement storage means preferably comprises a recorded voice announcement library for storing recorded voice announcements in digital voice files, and the management means preferably includes a recorded voice announcement index containing an entry for each voice file in the recorded voice announcement library.

According to a further aspect of the invention there is provided a telecommunications system for automatically loading and checking recorded announcements in a plurality of remotely located playback devices in a telephone network, said system including a central control and management station including:

announcement storage means for storing a plurality of recorded announcements;

access storage means including access details for each of said remotely located playback devices;

management means adapted to receive requests to load or modify the recorded announcement in at least one of said remotely located playback devices;

control means adapted to send the requested recorded announcement to said at least one remotely located playback device; and verification means adapted to verify that the requested recorded announcement has been correctly loaded into said at least one remotely located playback device.

The central control and management system may also include speech recognition means which can be used to check that a remotely located playback device has correctly loaded a recorded voice announcement. For this purpose the control means is arranged to instruct the remotely located playback device to play back the recorded voice announcement after loading.

A preferred embodiment of the present invention will now be described, by way of example only, with reference to the accompanying drawings, in which.

Figure 3A:
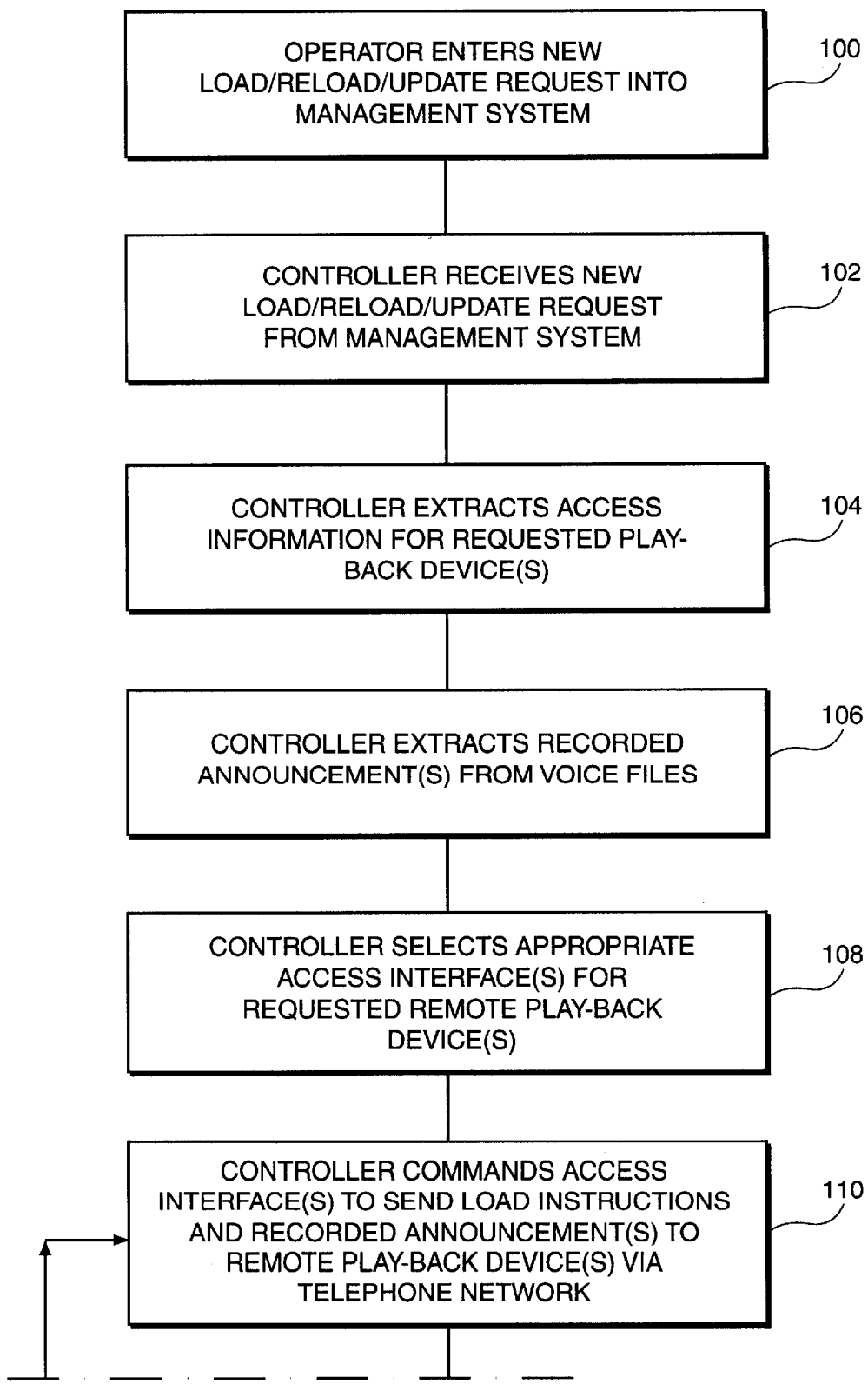
Figure 3B:
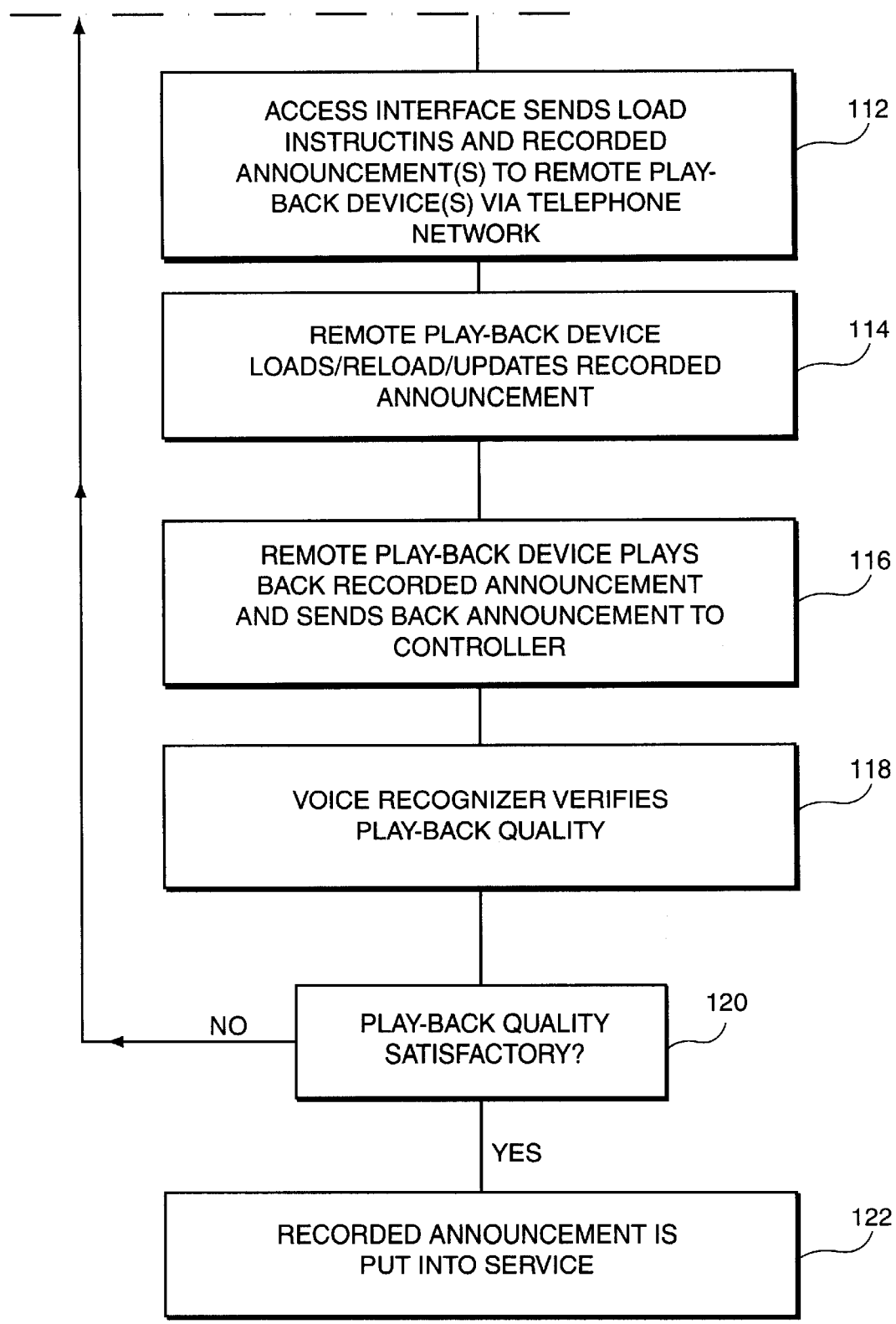

FIGS. 3a and 3b constitute a flow chart of a method of operation of the central control and management station.

Figure 1:
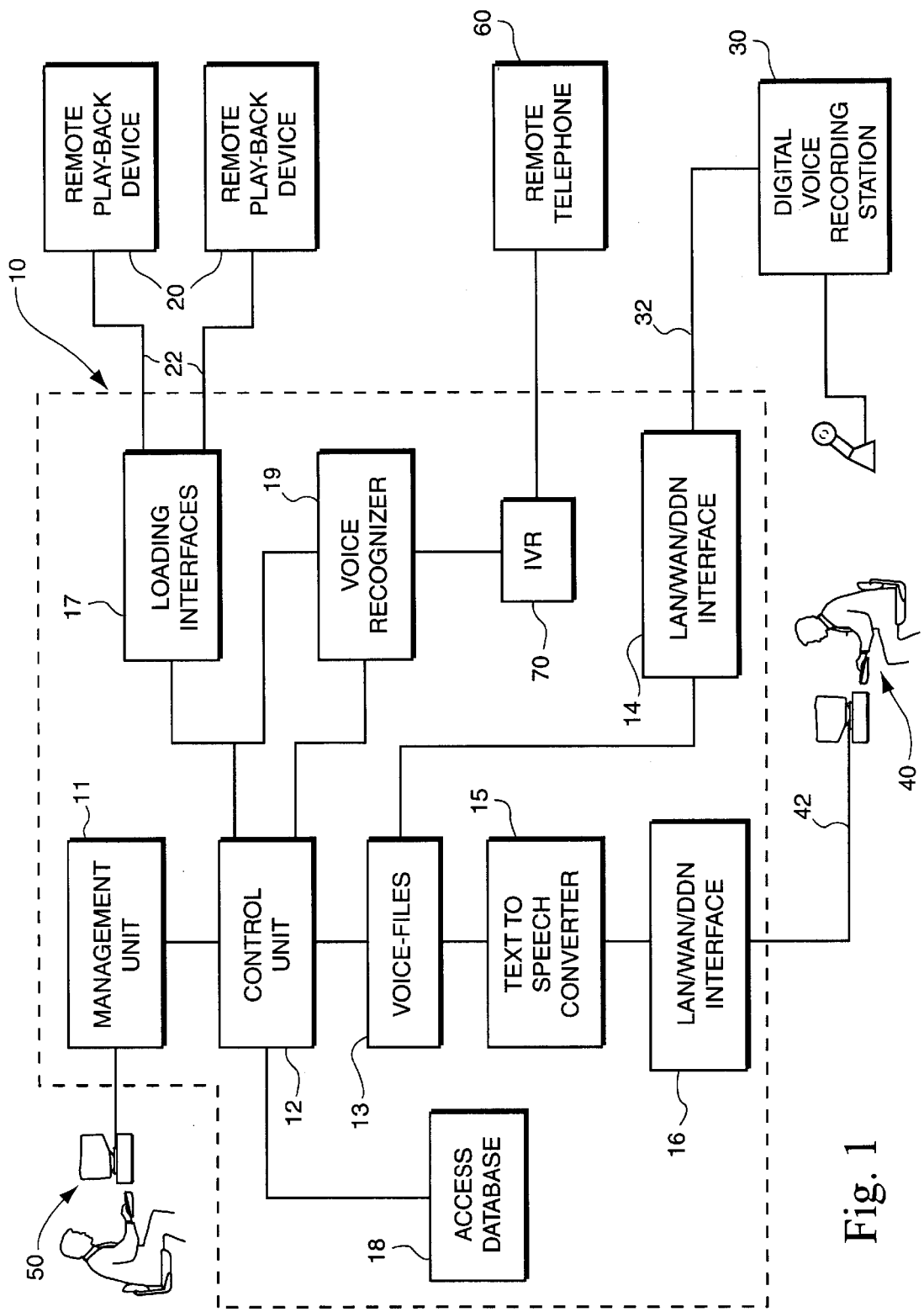
FIG. 1 is a block diagram of a system for loading recorded announcements in remote playback devices from a central control and management station.

The system shown in FIG. 1 comprises a central control and management station 10 for storing recorded announcements and for loading recorded announcements in a plurality of remote playback devices 20 at geographically dispersed locations in a telephone network.

The central control and management station 10 comprises a management system 11, a controller 12, announcement storage means in the form of a recorded voice announcement library 13 for storing voice files of recorded voice announcements in digital form, an interface 14 which enables the central control and management station 10 to receive recorded voice announcements from a digital voice recording station 30, a text to speech converter 15, an interface 16 which enables the central control and management station 10 to receive text messages from a text generating means 40, a plurality of loading interfaces 17 enabling the central control and management system to communicate with the remotely located playback devices 20 via telephone lines 22 of the telephone network, access storage means 18 in the form of a memory for storing an access data base containing instructions and details for accessing each playback device 20 of the system, and voice recognition means 19.

The internal connections between the management system 11, the controller 12, the recorded voice announcement library 13 and the other parts of the control and management station 10 preferably comprise high speed bus connections. The external connections 32, 42 between the digital voice recording station 30, the text generating means 40 and the interfaces 14 and 16 of the central control and management station 10 may comprise local area network (LAN), wide area network (WAN) or digital data network (DDN) communication links. The loading interfaces 17 may comprise any one or more of a series of interface connections for connecting the central control and management station 10 to various types of playback machines. The types of interface connections may include PCM, ISDN, DDN, X25 and X400 interfaces.

The voice files of recorded voice announcements in the voice announcement library 13 may be created and updated at any time by a voice artist at the digital voice recording station 30 and/or by a person creating or updating text messages at text generating means 40 connected to the LAN/WAN/DDN interface 16. The text generating means 40 may comprise a computer or keyboard connected by a LAN/WAN/DDN communication link. The text generating means 40 may be located at the central control and management station or at a remote location. The text messages received by the interface 16 are converted into digital voice announcements by the text to speech converter 15 before being stored in the voice files of the recorded voice announcement library.

Figure 2:
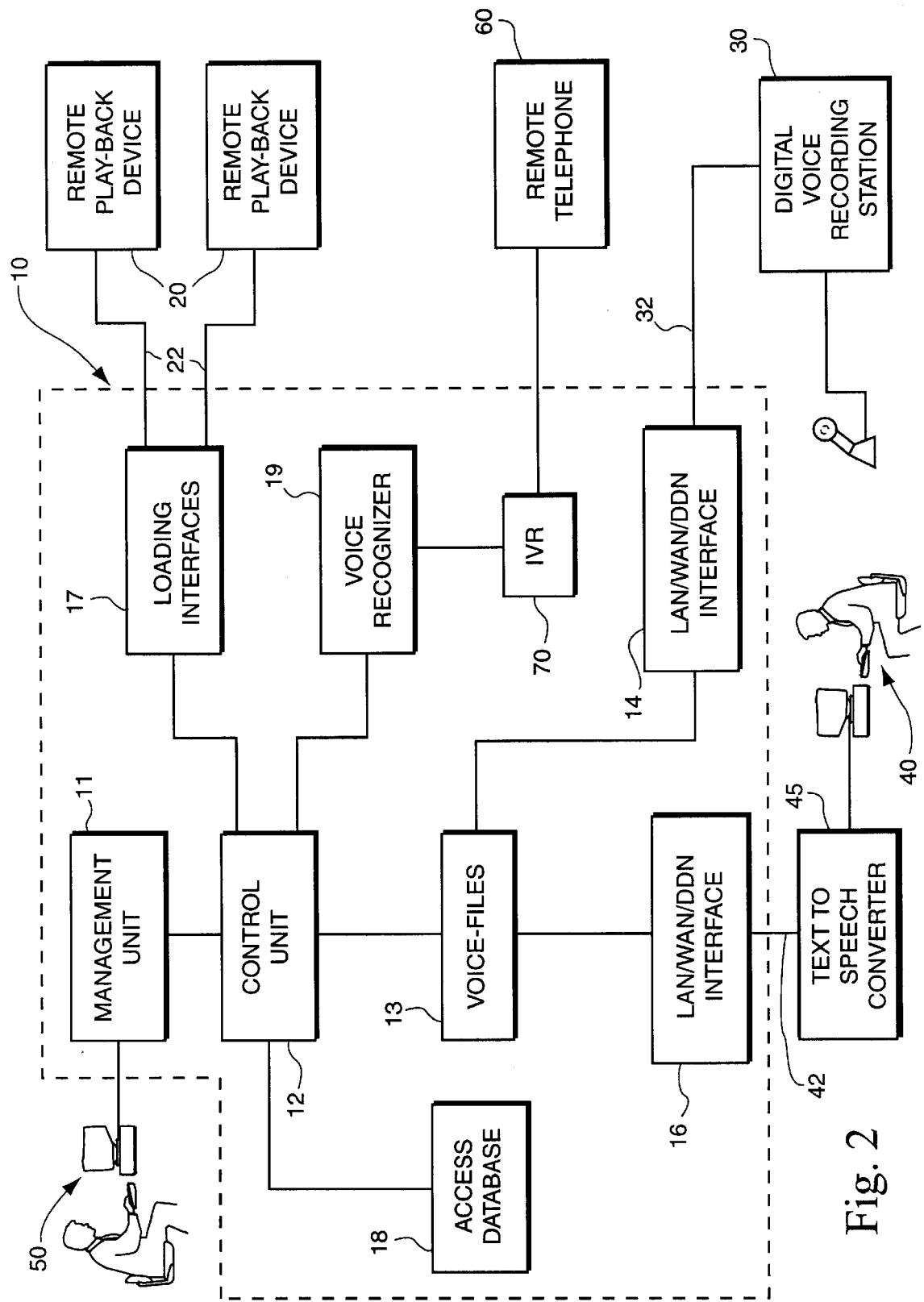
FIG. 2 is a block diagram of a modified system similar to that of FIG. 1.

A modified system shown in FIG. 2 is similar to the system of FIG. 1 and corresponding references have been applied to corresponding parts. The system of FIG. 2 differs from that of FIG. 1 in that the text to speech converter 45 is located at the text generating means 40 instead of at the central control and management station 10.

The management system 11 includes a play back machine data base containing information on each playback device 20 with which the central control and management system 10 is able to communicate, version and placement data bases for each play back machine, a recorded voice announcement library index of all the voice files stored in the recorded voice announcement library 13, an application index which links recorded voice announcements to specific applications and management programs for managing the system.

The management programs may include new load, update and reload programs, a reporter/tracker program and administrator and operator programs. The new load/update program may be programmed to receive remote access requests from an operator terminal 50, to check the access data base for authorization, to verify authorization codes, to control programs for receiving audio files of announcements in digital form from the digital recording station and from the text to speech converter, to control the text to speech converter, to verify the correctness of audio files converted by the text to speech converter and to control a load program of the controller 12.

The reload program may be programmed to accept an incoming request from an operator at terminal 50, or an incoming call from a remote telephone 60 to an interactive voice responsive device 70 connected to the automatic speech recognition unit 19, or a request from a playback device 20 for reloading of a program. The reload program may be arranged to verify authorization of the playback device and to control a reload program of the controller 12. The reporter/tracker program may be programmed to provide reports on activities, to store all events for analysis and to log all accesses and changes.

The administrator and operator programs may include terminal programs, access control authorization and access administration programs, authorization tables, native systems access programs, service modification and creating programs, machine administration and site administration programs.

The access data base stored in the access storage means 18 contains accessing details and access instructions for each playback device. The access data base may include a vendor data base, a machine data base, a site data base and a service data base. The vendor data base may include vendor and product identification details relating to the announcement services offered by different vendors in the telephone network, load method instructions, access type information (e.g. data file or speech access), and access details relating to the communication means or protocols used to access each vendor (e.g. G703, digital, X25, TCP/IP, X400, CCS7, ETSI CS1, ETSI CS2). The machine data base may include site, machine and service identification details for each playback device, product identification, access numbers and machine address sequences. The site data base may include site names, site identification codes, product identification and service identification details. The service data base may include service name details, service identification details and service announcement identification corresponding to service voice announcements stored in the voice files of the recorded voice announcement library.

The recorded voice announcement library 13 preferably comprises a hard disc mass storage unit which is able to store a large number of voice files in digital form. For each voice file stored in the recorded voice announcement library, a corresponding voice file index entry is created in the recorded voice announcement index of the management system. Each index entry may include a voice file name, service and announcement identification, revision details and the text of the voice announcement. The system may also include programs controlled by the management system for receiving audio files from the digital recording station (STR.VOX.TEXT) and for receiving audio files from the text to speech converter (STR.TEXT.VOX). The STR.VOX.TEXT program may be programmed to receive audio files and related text from the digital recording station, to store the audio files in digital form in the mass storage unit, and to create or update the voice file index entry in the recorded voice announcement index. The STR.TEXT.VOX program may be programmed to receive text and audio files from the text to speech converter, to store the audio files in digital form in the mass storage unit, and to create or update the voice file index entry in the recorded voice announcement index.

Each of the STR.VOX.TEXT and STR.TEXT.VOX programs may also receive service and announcement identification details and, where appropriate, revision details.

The manner in which recorded voice announcements are loaded remotely into the remotely located playback devices will now be described with reference to the flow chart of FIG. 3. When it is desired to load, reload or update a voice announcement in a number of playback devices, an operator enters a new load, reload, or update request into the management system 11 (step 100) from the operator terminal 50. The operator terminal 50 is preferably located at the control and management station 10, but it is conceivable that remote operator terminals may be provided to vendors of telephonic services in the network. In this case, the control and management station 10 may include a further network interface (e.g. LAN, WAN or DDN) to enable the management system 11 to communicate with remote operator terminals.

A new load, reload or update request will normally include the text of the voice announcements to be loaded, reloaded or updated as selected from the recorded voice announcement library index and details the playback device or devices to be loaded, reloaded or updated with the required voice announcement. If the requested voice announcement is not present in the recorded voice announcement library, a request may be sent from the central control and management station 10 to the digital voice recording station 30 for the creation of a new recorded voice announcement in digital form.

Alternatively, if a text to speech converter 15 is included in the control and management station 10, it may be used to create a new recorded voice announcement in digital form upon receipt of a requested text announcement from an operator terminal 50. It is also conceivable that the remote locations at which the playback devices 20 are located may include text to speech converters which upon receipt of announcement in text form from the central control and management station 10 may convert the text into voice announcements for loading into the remotely located playback devices 20.

Upon receipt of a new load, reload or update request, the management system checks the access data base for authorization for the required playback device or devices before passing the new load, reload or update request to the controller 12 (step 102). The controller 12 then extracts access information for the requested playback device or devices (step 104) and extracts the requested recorded voice announcement from the voice files of the recorded voice announcement library (step 106). The control program in the controller then selects the appropriate access or loading interface or interfaces 17 (e.g. G703, PSTN, ISDN or X-25 PAD (Packet Assembler/Dis-assembler) for the requested playback. device or devices 20 (step 108) and commands the access or loading interface or interfaces 117 to send load instructions and the recorded announcement or announcements to the requested remotely located playback device or devices 20 (step 110).

When commanded by the control program of the controller 12, the or each loading interface 17 sends the recorded announcement and appropriate load instructions to the or each requested remote playback device 20 via the telephone network which includes the requested playback device or devices 20 (step 112). The recorded announcements are preferably sent from the central control and management station 10 via the telephone network in the form of digital signals, although it is possible that the recorded announcements may be sent in analog form. In this case, the central control and management station may include a playback device (not shown) so that the automatic speech recognizer 19 can be used to verify the quality of the recorded voice announcement before it is sent to the remote playback device or devices.

Upon receipt at the remote playback device or devices 20, the recorded announcement or announcements are loaded into the playback device or devices in accordance with the load instructions (step 114). The load instructions may instruct the or each playback device to load a new announcement, to update or modify an existing announcement and/or to reload an announcement.

The load instructions may also include instructions for the remote playback device or devices 20 to play back a recorded voice announcement after it has been downloaded and to send the recorded announcement back to the central control and, management station 10 (step 116). Then the automatic speech recognizer 19 at the central control or management station 10 can be used to verify the play back quality of the recorded announcement or announcements (step 118) after loading in the remote playback device or devices 20 and before the central control and management system orders the remote playback device 20 to put the recorded announcement into service. If the play back quality is satisfactory (step 120), the recorded announcement is put into service (step 122), the process ends and the controller 12 can report to the reporter/tracker of the management system 11 that successful loading/updating/reloading of the requested recorded announcement or announcements has taken place in the requested remote playback device or devices 20. If the play back quality is unsatisfactory, or if no loading has taken place at the remote play back, the device 20, controller 12 may re-issue its commands to the loading interface 17 (step 110) to re-send the recorded announcement or announcements and load instructions to the remote playback device or devices 20 (step 112) for reloading (step 114). Steps 110 to 120 may be repeated a number of times either until the play back quality of the recorded announcement or announcements is satisfactory or until the controller 12 stops issuing reload commands to the loading interface 17. In the latter case, the controller 12 reports to the reporter/tracker of the management system 11 that loading has been unsuccessful.

It will be appreciated that various modifications and alterations may be made to the system as described above with reference to the drawings without departing from the scope or spirit of the invention.

What is claimed is:

1. A telecommunications system including a plurality of remotely located playback devices belonging to a plurality of different vendors providing different telephonic services in a telephone network, wherein said system includes a central control and management station for automatically loading and/or modifying recorded announcements in the plurality of remotely located playback devices of the different vendors, said central control and management station comprising:

announcement storage means for storing a plurality of recorded announcements;

access storage means including access details for each of the remotely located playback devices of said plurality of different vendors;

a management means for receiving requests from a vendor to load or modify a recorded announcement in at least one of said remotely located playback devices of said vendor; and control means for retrieving the recorded announcement from said announcement storage means and sending the requested recorded announcement to said at least one remotely located playback device of said vendor via the telephone network for loading in said at least one remotely located playback device, so that said at least one remotely located playback device plays said recorded announcement after receiving the recording announcement from said central control and management station.

2. A system according to claim 1 wherein the access storage means includes a machine database including machine identification details and access instructions for each of the remotely located playback devices.

3. A system according to claim 1 wherein the central control and management station includes a plurality of loading interfaces adapted to communicate with said plurality of remotely located playback devices via different communication means or protocols.

4. A system according to claim 3 wherein the access storage means includes a vendor database containing vendor identification details relating to the different vendors offering recorded announcement services in the telephone network, and access details relating to the communication means or protocols used to access each vendor's playback devices.

5. A system according to claim 4 wherein upon receiving a load or update request from a vendor, the management means is programmed to check vendor identification details in the vendor database before authorising the control means to send a requested recorded voice announcement to said at least one remotely located playback device.

6. A system according to claim 1 wherein the central control and management station includes announcement generating means to create new announcements for storage in said announcement storage means.

7. A system according to claim 1 wherein the central control and management station includes an interface to communicate with announcement generating means for creating new announcements.

8. A system according to claim 6 wherein, upon receiving a request to load or update a recorded announcement in at least one remotely located playback device, the management means is programmed to check whether the requested announcement is present in the announcement storage means and, if the requested announcement is not present, the management means is programmed to request the announcement generating means to create a new announcement for storage in the announcement storage means.

9. A telecommunications system for automatically creating and loading or modifying recorded announcements in a plurality of remotely located playback devices in a telephone network, said system including a central control and management station comprising:

announcement storage means for storing a plurality of recorded announcements;

access storage means including access details for each of said remotely located playback devices;

management means for receiving requests to load or modify a recorded announcement in at least one of said remotely located playback devices; and control means adapted to send the requested recorded announcement to said at least one remotely located playback device so that the recorded announcement can be played by said at least one remotely located playback device after receipt of the recorded announcement from the central control and management station;

wherein the system includes announcement generating means for creating new announcements for storage in said announcement storage means, and the management means is programmed to check whether the requested announcement is present in the announcement storage means and, if the requested announcement is not present, the system is arranged to create a new announcement automatically for storage in the announcement storage means.

10. A system according to claim 9 wherein the announcement storage means comprises a voice announcement library of voice files in digital form and the management means includes a recorded voice announcement index containing an entry for each voice file stored in the voice announcement library.

11. A system according to claim 9 wherein the announcement generating means includes a text to speech converter for converting text messages to digital voice announcements.

12. A system according to claim 9 wherein the announcement generating means includes a digital voice recording station.

13. A system according to claim 1 wherein the central control and management station includes verification means for verifying that a recorded announcement has been correctly loaded into a remotely located playback device.

14. A telecommunications system for automatically loading and checking recorded announcements in a plurality of remotely located playback devices in a telephone network, wherein said system includes a central control and management station including:
   announcement storage means for storing a plurality of recorded announcements;
   access storage means including access details for each of said remotely located playback devices;
   management means adapted to receive requests to load or modify the recorded announcement in at least one of said remotely located playback devices;
   control means adapted to send the requested recorded announcement to said at least one remotely located playback device so that the recorded announcement can be played at the at least one remotely located playback device; and
   verification means adapted to verify that the requested recorded announcement has been correctly loaded into said at least one remotely located playback device.

15. A system according to claim 14 wherein the central control and management station includes speech recognition means.

16. A system according to claim 15 wherein the control means is arranged to instruct the remotely located playback device to play back the recorded announcement after loading so that the speech recognition means can verify the quality of the loaded announcement.

17. A system according to claim 15 wherein the speech recognition means is connected to an interactive voice response interface connected to an external telephone line and allowing the central control and management system to receive requests for loading or reloading or replaying of recorded announcements from a remote telephone.

18. A system according to claim 14 wherein the management means is programmed to reload the requested recorded announcement in the remotely located playback device if it is not correctly loaded or if the play back quality is unsatisfactory.

19. A central control and management station for automatically creating, loading and verifying recorded announcements at a plurality of remotely located playback devices in a telephone network, wherein said station includes:
   at least one interface for connection to announcement generating means for creating new announcements;
   announcement storage means for storing recorded announcements created by the announcement generating means;
   access storage means includes access details for each of said remotely located playback devices;
   management means adapted to receive requests to load a recorded announcement in at least one of said remotely located playback devices;
   control means adapted to send the requested recorded announcement to said at least one remotely located playback device so that the recorded announcement can be played by the at least one remotely located playback device after receipt of the recorded announcement from the central control and management station; and
   verification means adapted to verify whether the requested recorded announcement has been correctly loaded in said at least one remotely located playback device.

20. A system according to claim 7 wherein, upon receiving a request to load or update a recorded announcement in at least one remotely located playback device, the management means is programmed to check whether the requested announcement is present in the announcement storage means and, if the requested announcement is not present, the management means is programmed to request the announcement generating means to create a new announcement for storage in the announcement storage means.

* * * * *